(12) United States Patent
Sistla et al.

(10) Patent No.: US 9,846,463 B2
(45) Date of Patent: Dec. 19, 2017

(54) COMPUTING SYSTEM AND PROCESSOR WITH FAST POWER SURGE DETECTION AND INSTRUCTION THROTTLE DOWN TO PROVIDE FOR LOW COST POWER SUPPLY UNIT

(71) Applicant: Intel Corporation, Santa Clara, CA (US)

(72) Inventors: Krishnakanth Sistla, Beaverton, OR (US); Martin Mark Rowland, Beaverton, OR (US); Efraim Rotem, Haifa (IL); Brian J. Griffith, Auburn, WA (US); Ankush Varma, Hillsboro, OR (US); Anupama Suryanarayanan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 13/631,824

(22) Filed: Sep. 28, 2012

(65) Prior Publication Data
US 2014/0095905 A1    Apr. 3, 2014

(51) Int. Cl.
*G06F 1/26*     (2006.01)
*G06F 1/32*     (2006.01)

(52) U.S. Cl.
CPC .............. *G06F 1/26* (2013.01); *G06F 1/3203* (2013.01); *G06F 1/329* (2013.01); *G06F 1/3243* (2013.01); *Y02B 60/1239* (2013.01); *Y02B 60/144* (2013.01)

(58) Field of Classification Search
CPC . G06F 1/26; G06F 1/28; G06F 1/3203; G06F 1/3237; G06F 1/3243; G06F 1/329; Y02B 60/1239; Y02B 60/144

USPC .......................................... 713/320, 323, 322
See application file for complete search history.

(56) References Cited

U.S. PATENT DOCUMENTS

| | | | |
|---|---|---|---|
| 5,664,202 A * | 9/1997 | Chen et al. .................... | 713/340 |
| 6,219,796 B1 | 4/2001 | Bartley | |
| 6,304,978 B1 | 10/2001 | Horigan et al. | |
| 6,363,490 B1 | 3/2002 | Senyk | |
| 6,415,388 B1 * | 7/2002 | Browning et al. ............. | 713/322 |
| 6,564,328 B1 * | 5/2003 | Grochowski et al. ......... | 713/320 |
| 6,704,877 B2 | 3/2004 | Cline et al. | |
| 2003/0126479 A1 * | 7/2003 | Burns et al. ................... | 713/300 |
| 2004/0064745 A1 * | 4/2004 | Kadambi ....................... | 713/322 |
| 2006/0288241 A1 * | 12/2006 | Felter et al. ................... | 713/300 |
| 2008/0104436 A1 * | 5/2008 | Sawyers et al. ............... | 713/323 |
| 2008/0168287 A1 * | 7/2008 | Berry ...................... | G06F 1/266 |
| | | | 713/323 |

(Continued)

OTHER PUBLICATIONS

PCT International Search Report for PCT Counterpart Application No. PCT/US2013/046655, 5 pages, (Oct. 18, 2013).

(Continued)

*Primary Examiner* — Terrell Johnson
(74) *Attorney, Agent, or Firm* — Nicholson De Vos Webster & Elliott, LLP

(57) ABSTRACT

A processor is described that includes a quick signal path from an input of the processor to logic circuitry within the processor. The input is to receive a fast throttle down signal. The logic circuitry is to throttle down a rate at which the processor issues instructions for execution in response to the fast throttle down signal. The quick signal path is to impose practicably minimal propagation delay of the fast throttle down signal within the processor.

23 Claims, 6 Drawing Sheets

(56) References Cited

U.S. PATENT DOCUMENTS

| | | | |
|---|---|---|---|
| 2009/0049316 A1* | 2/2009 | Khatri | G06F 1/3293 713/320 |
| 2010/0077237 A1* | 3/2010 | Sawyers | G06F 1/26 713/300 |
| 2014/0068311 A1* | 3/2014 | Jenne | 713/340 |

OTHER PUBLICATIONS

PCT Written Opinion of the International Searching Authority for PCT Counterpart Application No. PCT/US2013/048655, 7 pages.
PCT/US2013/048655 Notification Concerning Transmittal of International Preliminary Report on Patentability, dated Apr. 9, 2015, 9 pages.
First Office Action from foreign counterpart China Patent Application No. 201380039994.1, dated Dec. 1, 2016, 23 pages.

* cited by examiner

COMPUTING SYSTEM AND PROCESSOR WITH FAST POWER SURGE DETECTION AND INSTRUCTION THROTTLE DOWN TO PROVIDE FOR LOW COST POWER SUPPLY UNIT

FIELD OF INVENTION

The field of invention pertains generally to computing systems, and, more specifically, to a computing system and processor with fast power surge detection and instruction throttle down to provide for low cost power supply unit.

BACKGROUND

FIG. 1 shows a typical power supply arrangement 100 for a processor 101. As observed in FIG. 1, a power supply unit 105 and a voltage regulator 102 act together to provide the specific supply voltage, with adequate supply current, to the processor 101 over the course of the processor's operation. The voltage regulator 102 provides the specific supply voltage to the processor at processor supply node 103. Modern day processors typically accept a variable range of supply voltages (e.g., 0.6 to 1.8 volts (V)) under the control of the processor itself (for simplicity, the connection from the processor to the voltage regulator 102 or other component to effect supply voltage control is not shown).

In order to provide a "stable" supply voltage to the processor 101, the voltage regulator 102 receives, at input 104, an input voltage that is higher than the supply voltage at supply node 103. For example, modern day voltage regulators that supply a +1.8 V supply voltage can typically accept a voltage anywhere within a range of +4.0 V to +36.0 V at input 104. The voltage regulator 102 therefore "steps down" the voltage received at input 104 (e.g., +12.0 V) to the supply voltage provided at supply node 103 (e.g., +1.8 V). According to one view, the stepping down activity of the voltage regulator 102 permits for a "steady" supply voltage at node 103 in the face of dramatic swings in current draw from the processor 101.

When the processor does draw significant amounts of current, an effect can be observed at input node 104. Specifically, a sudden current draw derived from the increase in power demanded by the processor 101 and the inefficiency of the voltage regulator 102 will be observed at node 104. For example, consider a processor that receives a supply voltage of +1.8 V at supply node 103 and nominally draws a current of 36 Amps (A). A +1.8 V supply voltage and 36 A current draw corresponds to 65 Watts (W) of power dissipation in the processor ((1.8 V)*(36 A)=65 W). The power supply unit 105 will need to supply not only enough power for the processor (65 W) but also additional power to compensate for the less than perfect efficiency of the voltage regulator 102.

For example, if the regulator 102 is 80% efficient, which is presently typical, an additional 20% power increase needs to be provided to the voltage regulator 102 from the power supply unit 105. That is, ((65 W)/0.8)=80 W needs to be provided by the power supply unit 105 to the voltage regulator 102. If the power supply unit 105 feeds a +12 V input voltage to the voltage regulator 102 at node 104, the voltage regulator's current draw from the power supply unit will be ((80 W)/12 V)=6.67 A. (Note that the effect of the step down conversion from +12 V to +1.8 V by the voltage regulator 102 includes comparatively lower current draw demanded by the voltage regulator 102 than the processor 101).

If the processor 101 suddenly increases its current draw demand from 36 A to 56 A, the power supply unit 105 will observe a current draw increase by the voltage regulator 102 from 6.67 A to 10.42 A (assuming the voltage provided by the power supply unit stays fixed at +12 V). That is, the power dissipation in the processor 101 will increase to (56 A)*(1.8 V)=100 W. To account for the less than perfect efficiency of the voltage regulator 102, the power supply unit will need to supply 100 W/0.8=125 W to the voltage regulator 102. Supplying 125 W at +12 V corresponds to 125 W/12 V=10.42 A.

The above analysis bears out that the power supply unit 105, owing to the inefficiency of the voltage regulator 102, is typically designed to supply significantly more power than the processor consumes. Typically, the more power a power supply unit 105 is designed to provide, the larger and more expensive the power supply unit becomes.

BRIEF DESCRIPTION OF THE DRAWINGS

A better understanding of the present invention can be obtained from the following detailed description in conjunction with the following drawings, in which.

DETAILED DESCRIPTION

A problem is that as processor power consumption continues to increase (e.g., due to increasing transistor counts, die size and clock speed), so to does the maximum power rating of the power supply unit 105. Making matters worse is that the maximum power draw of the processor can, in certain rare situations (e.g., an "optimized power virus loop"), far exceed its "typical" maximum power draw (e.g., at its highest performance state under a workload that is more typical of the kind of workloads that cause the processor to enter its highest performance state). For example, the rated Pmax power draw of a processor may be 100% higher than what a processor normally draws when processing the kind of workload that is typical when the processor is operating at its highest performance state.

Here, Pmax is closer to a measure of the theoretical worst case power draw of the processor rather than what a processor will typically draw when asked to perform its largest workloads in a real world application. For example, Pmax may correspond to the power drawn when the processor is asked to process a continuous stream of the most energy consuming instruction(s) at the processor's highest supply voltage and operating frequency. In real world applications, such an instruction stream is unlikely. Nevertheless, systems are designed to handle the Pmax event should it happen. As such, the power supply unit 105 tends to be designed with a size and cost that is well beyond what would otherwise be sufficient under normal operating circumstances.

Figure 1:
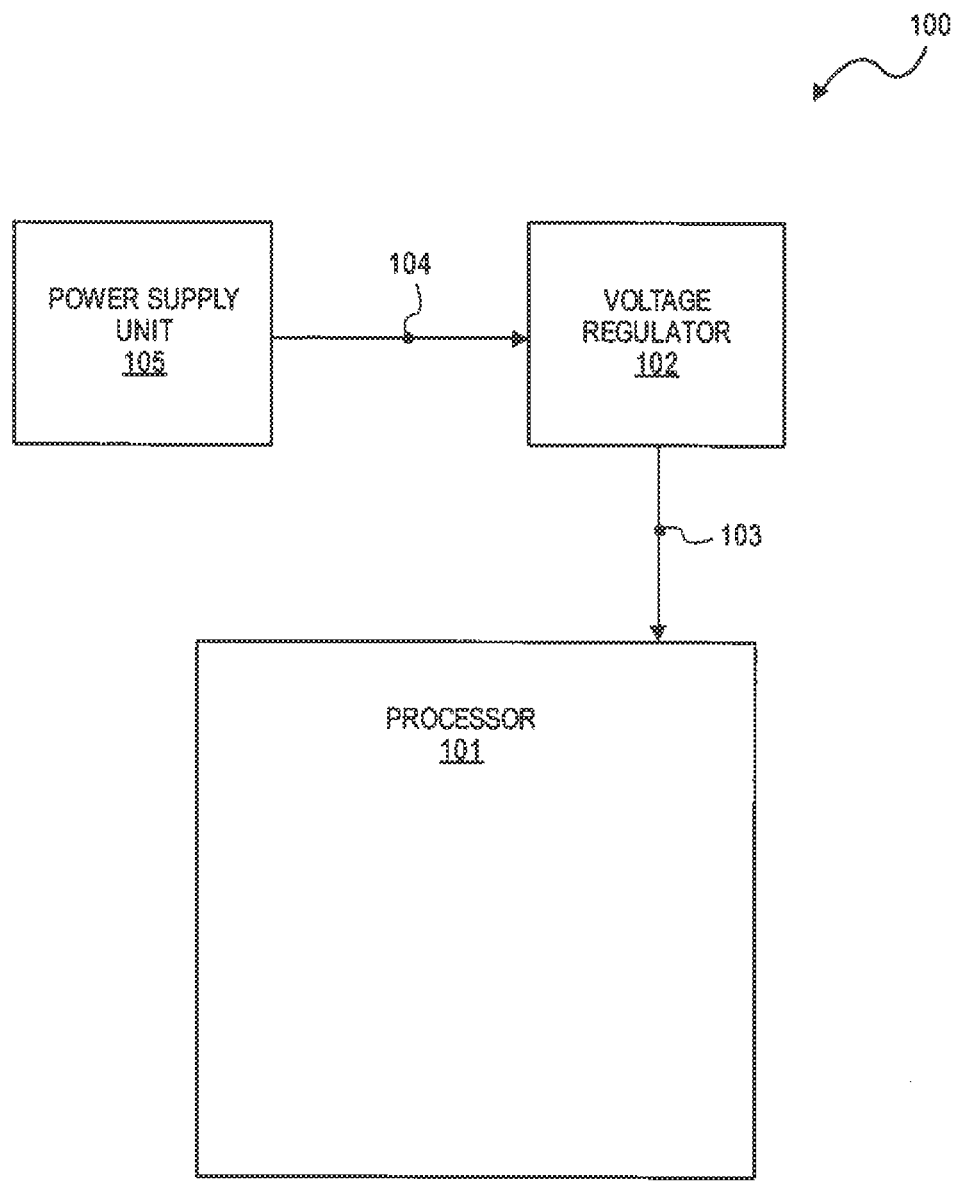
FIG. 1 shows a traditional design for a processor's power supply.
Figure 2:
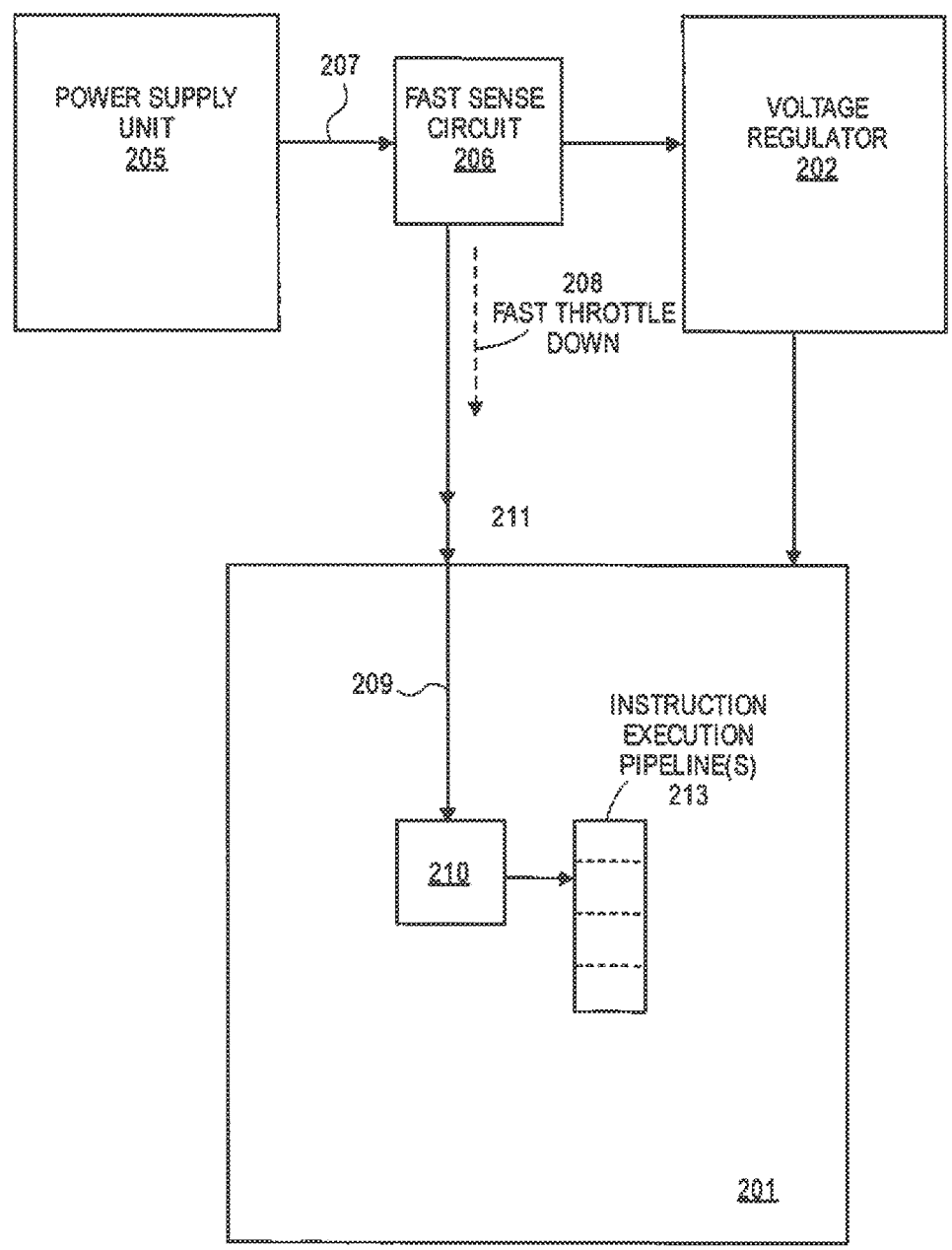
FIG. 2 shows an improved power system design.

FIG. 2 pertains to an improved design that should permit for smaller and/or cheaper power supply units 205 even with increasing processor Pmax over future processor generations. A design perspective of the approach of FIG. 2 is that a smaller and/or cheaper power supply unit will not be able to provide sufficient power to the voltage regulator 102 at Pmax for sustained periods of time. However, a smaller, cheaper power supply unit can provide sufficient power to the voltage regulator 102 under a Pmax power draw for a brief, limited period of time (e.g., 100 µs).

As such, referring to FIG. 2, fast power sense circuitry 206 is inserted at the power supply unit output 207 to quickly detect a surge in power draw from the voltage regulator 202 that exceeds a pre-defined power level that is established for the power supply unit 205. In an embodiment, the pre-established power level is below what the power supply unit would be asked to provide if the processor were to draw a Pmax level of power.

The fast power sense circuitry 206 can detect an increase in power draw at the power supply output 207 with specially designed analog and/or digital circuitry that measures, for example, the current draw from the voltage regulator 202, or, the current draw from the voltage regulator 202 and/or the voltage provided by the power supply unit 205.

In response to its fast detection that the power draw from the voltage regulator 202 has exceeded a pre-established threshold, the power sense circuitry 206 raises a fast throttle down signal 208 to the processor 201. The fast throttle down signal 208 is received at an input 211 of the processor 201, and routed through a "quick" signal path 209 within the processor 201 to logic circuitry 210 that controls, in some manner, the rate at which instructions are executed by the instruction execution pipeline(s) 213 within the processor 201. For example, logic circuitry 210 may control the rate at which instructions for the pipeline(s) 213 are fetched (e.g., from cache, system memory or both) and/or the rate at which fetched instructions are fed (issued) to the pipeline(s) 213.

The quick signal path 209 is designed so that the fast throttle down signal 208 endures only a small propagation delay end-to-end from the processor input 211 to logic circuitry 210. Small propagation delay can be effected, for instance, by minimizing the number of logic gates or other types of logic processing between the input 211 and logic circuitry 210. The quick signal path 209 may also be implemented, at least in sections, as a transmission line with controlled (e.g., specifically designed) characteristic impedance to minimize signal distortion as it propagates through the processor.

The transmission line may be driven by a driver circuit having a source impedance that substantially matches the characteristic impedance of the transmission line, and, may be terminated with a termination resistance that matches the characteristic impedance of the transmission line. Conceivably, the end-to-end run length of the quick path 209 may be broken down into a series of transmission line segments, for example, where each segment has its own driver and termination pair as discussed just above.

Essentially, in an embodiment, one or more analog transmission lines are effected to transport the signal, e.g., as quickly as possible, from the input 211 to logic circuitry 210. By so doing, substantial logical processing implemented with logic gates each having an associated, unwanted propagation delay are avoided as much as is practicable. The result is that the fast throttle signal's propagation delay through the processor 201 is reduced so that it reaches logic circuit 210 as fast as practicable.

From the discussion above, emphasis is therefore made to reduce the overall propagation delay through the power sense circuitry 206 and along the quick signal path 209 within the processor 201. By so doing, logic circuitry 210 causes the instruction execution pipeline(s) 213 to reduce the rate at which instructions are executed "almost immediately" after a power draw exceeding a threshold for the power supply unit 205 occurs.

Here, the more the propagation delay through these circuits 206, 209 is reduced, effectively, the smaller and cheaper the power supply unit 205 is permitted to be. As alluded to above, a power supply unit 205 can typically handle a "power surge" beyond its rated maximum for a brief moment of time—but not a sustained period of time. By designing into the system a closed loop response that quickly reduces the power draw of the processor 201 within the time window that the power supply unit 205 can supply power beyond its pre-established threshold, a larger more expensive power supply designed to handle extreme power surges over sustained periods of time need not be designed into the system. As such, the system can "get away with" using a lower performance power supply unit 205.

Figure 3:
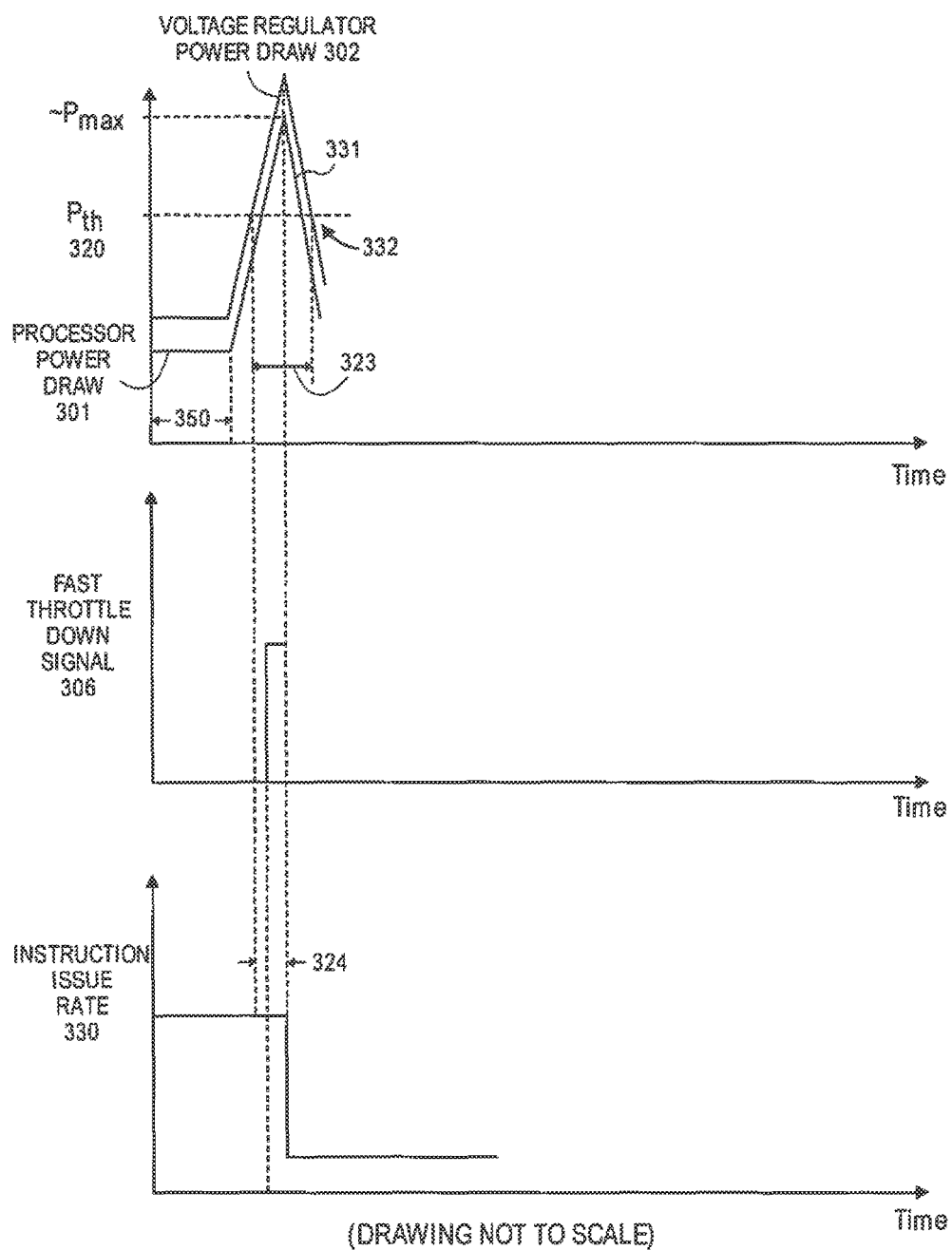
FIG. 3 shows a timeline of operation of the power system of FIG. 2.

FIG. 3 illustrates the scenario in a timeline fashion. In initial time period 350, the power draw from the processor 301 is well below its Pmax "worst case" scenario. As such the power draw of the voltage regulator 302 upon the power supply unit, which, for example, may be 25% higher than the power draw of the processor 301 because of voltage regulator inefficiency, is also below the threshold level 320 that is pre-established for the power supply unit.

After time window 350, the processor suddenly approaches a worst case Pmax power draw state. The voltage regulator power draw 302 surges in response. During the surge, the power draw from the voltage regulator surpasses the threshold 320 for the power supply unit 305. Shortly thereafter, the power sense circuit raises the fast throttle down signal 306 which quickly propagates through the processor and reaches logic that begins to throttle down the instruction issue rate 330. The processor power draw 301 begins to drop in response 331 and ultimately causes the power draw from the voltage regulator 302 to fall 332 below the threshold 320.

Viewing any voltage regulator power draw beneath threshold 320 as a power draw that the power supply unit can handle for a sustained period of time, and, any power draw above threshold 320 as a power draw that the power supply unit cannot handle for a sustained period of time, but can handle for a brief period of time, note that the fast action of the power sense circuit and low propagation delay path through the processor causes the power supply draw from the voltage regulator 302 to exceed the power supply unit's threshold level 320 for only a brief period of time 323. As such, a power supply unit that is not capable of satisfying a sustained power draw when the processor is drawing at its Pmax level (and, e.g., is only capable of satisfying a sustained power draw at or below threshold level 320) can nevertheless be implemented in the system.

In an embodiment, the brief amount of time that the smaller and/or less expensive power supply unit can provide power when above its threshold level 320 is about 100 µs. Thus, in an embodiment, time period 323 should be less than 100 µs. High performance sense circuitry should be able to achieve sense times within a 1-10 µs range.

In one embodiment, a 40 µs time budget is specified for time period 324. Here, it should take 40 µs from the moment the power draw of the voltage regulator 302 surpasses threshold 320 to the moment the power draw from the voltage regulator 302 begins to decrease. According to one approach, the total time budget is approximately split between the power sense circuit and the processor. As such, the power sense circuit is allocated 20 µs to raise the fast throttle down signal after the voltage regulator power draw surpasses threshold 320, and, the processor is allocated 20 μs to begin reducing its power consumption after it first receives the fast throttle down signal (note FIG. 3 is not drawn to scale). This leaves 60 μs for the falling power draw from the voltage regulator 302 to drop beneath the threshold 320.

In an embodiment, the threshold level 320 established for the power supply unit is no lower than what the power draw on the power supply unit is expected to be when the processor is in its highest performance state and is processing a workload that is typical of the kinds of workloads that are processed by the processor in its highest performance state (or some percentage, e.g., 10%, beyond such a power draw). In another or related embodiment, the threshold 320 is no higher than a power that would be drawn if the processor were drawing at its Pmax level. In many embodiments threshold level 320 would be significantly beneath this level.

In order to assist system designers, in an embodiment, the processor's published specifications articulate a fast throttle down signal response that specifies the propagation delay from the moment the processor receives the fast throttle down signal to the moment the processor begins to reduce its power draw. In a further embodiment, the published specifications also specify a rate or envelope at which the power draw decays or other similar information. For example, the published specification may specify one or more propagation delays that specify the amount of time, after assertion of the fast throttle down signal at the processor input, for the processor's power draw to fall from the Pmax level to one or more lower levels.

With this type of information, system designers can determine the appropriate voltage regulator response times and power draws and the power sense circuit response times for any particular power supply unit threshold level 320. The power supply unit threshold level 320 essentially determines the size and/or cost of the power supply. That is, smaller and/or cheaper power supply units will have lower threshold levels 320 than larger and/or more expensive power supply units. As such, the more motivated a designer is to integrate a smaller and/or less expensive power supply unit into the system, the designer is correspondingly motivated to integrate a faster power sense circuit 206 and voltage regulator 202.

In a further embodiment, the "throttled down" instruction issue rate of the instruction execution pipeline(s) that result in response to an asserted fast throttle down signal is a programmable feature of the processor. This permits system designer control of the rate at which the processor will reduce its power consumption once the fast throttle down signal has been asserted. For example, the processor may include model specific register (MSR) space that permits an Operating System (OS) instance or Virtual Machine Monitor (VMM) to set a value in the MSR space that sets a maximum limit on the number of instructions that can be fetched and/or issued per unit of time. Not that a limit on instruction fetch into the pipeline essentially limits instruction issue. As such instruction issue will be used to refer to both mechanisms.

A lower limit will cause the processor's power consumption to fall more rapidly once the fast throttle down signal has been asserted than a higher limit. Permitting the system designer to specify the power reduction rate of the processor in response to an assertion of the fast throttle down signal should provide the system designer with additional flexibility in terms of defining an appropriate voltage regulator, power sense circuit and power supply unit. In an embodiment, the specifications for the processor also specify different power reduction rates of the processor for different programmed reduced instruction fetch and/or issue rate values.

According to another approach, once the fast throttle down signal is asserted, the instruction execution pipelines stop issuing instructions so that the processor effectively stops further processing activity and instantaneously drops its power draw at a maximum or near maximum rate. Complete cessation may be hardwired into the processor by fixed design, or, the user may be able to program a value of 0 instructions fetched/issued per unit time in, e.g., MSR space.

Regardless of the rate at which instruction issuance is throttled down, different design options also exist as to how to exit the throttled down mode after it is entered. According to a first approach, the throttled down mode exists for a fixed time period and then switches over to an established performance state of the processor. In an embodiment the performance state is not the highest performance state. Entry into a performance state that is lower than the highest performance state should force at least one of a supply voltage and/or a clock frequency of the processor to be reduced compared to the voltage/frequency that existed prior to the processor's reception of the fast throttle down signal.

In another embodiment, the time period that the processor spends in throttle down mode is programmable. That is, for example, an OS instance or VMM may enter a value in MSR space that establishes how long the processor is to remain in throttle down mode once the mode is entered. In a further or alternate embodiment, the specific performance state that the processor switches over to when coming out of the throttle down state can also be programmed into the processor in, e.g., MSR space.

In an even further embodiment, reception of the fast throttle down signal causes an interrupt or other kind of warning flag to be raised to software (e.g., OS instance or VMM) so that the, for example, the instruction sequence that caused the power surge can be branched out of, or, processed in a lower performance state. Either or both of these reactions can be imposed by way of software control through appropriate registers. Here, the processor may be designed to include logic circuitry that raises the interrupt or flag in response to the processor's reception of the fast throttle down signal.

It is believed that the software processes discussed above may be performed with a processor, controller, microcontroller or similar component. As such these processes may be implemented with program code such as machine-executable instructions that cause a machine that executes these instructions to perform certain functions. These processes may also be performed by (in the alternative to the execution of program code or in combination with the execution of program code) by electronic circuitry designed to perform the processes (or a portion thereof).

It is believed that any software processes may be described in source level program code in various object-orientated or non-object-orientated computer programming languages. An article of manufacture such as a computer readable medium may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 4A:
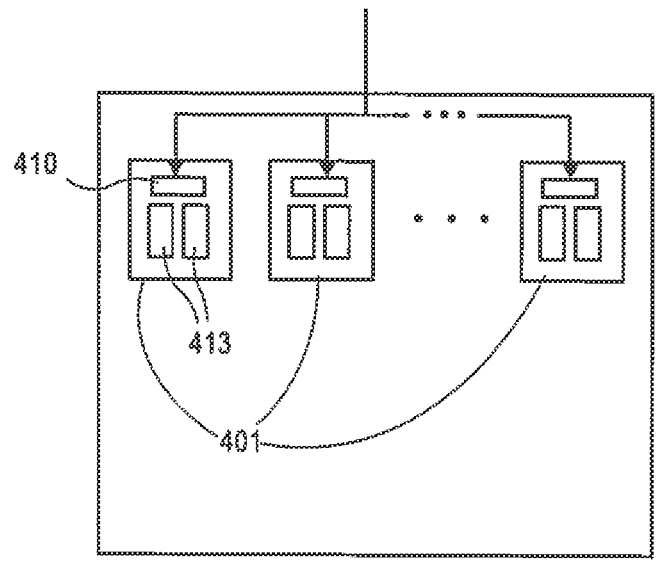
FIGS. 4a,b show different processor and system configurations that may utilize the concepts of FIGS. 2 and 3.
Figure 4B:
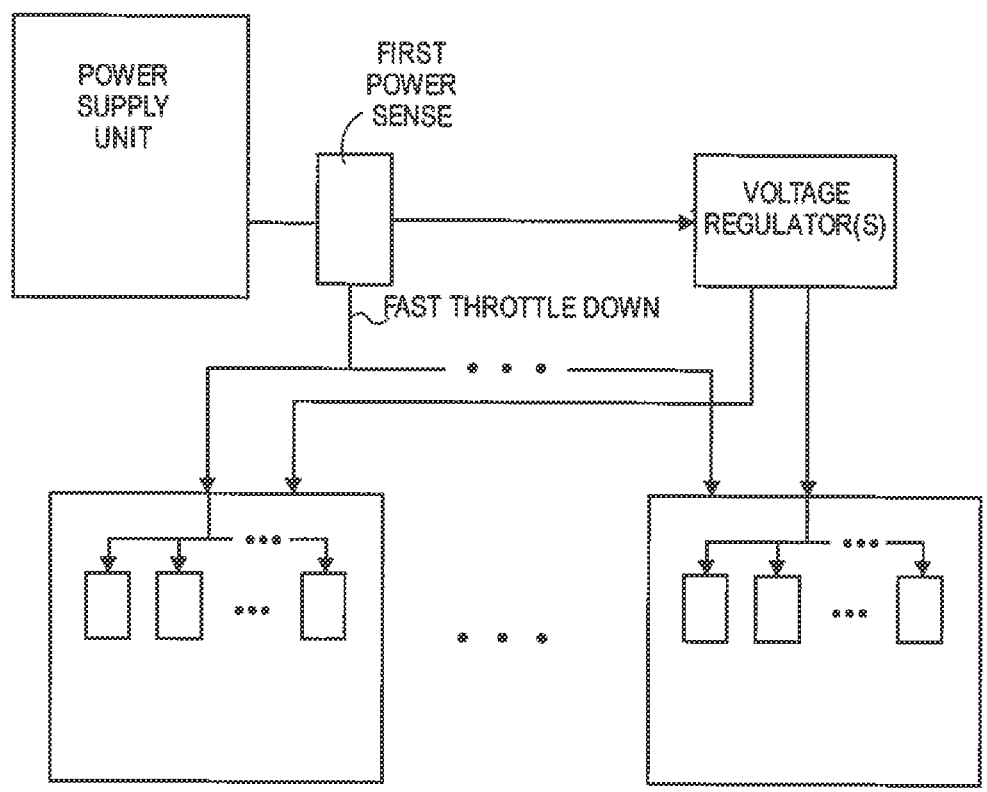

FIG. 4a shows a single processor 401 having multiple processing cores 402 where each core has multiple instruction execution pipelines 413. As observed in FIG. 4a, the single fast throttle signal is routed to logic circuitry 410 that throttles instruction issue for each individual pipeline within the processor from the single fast throttle signal input. Here, the different paths to the different pipelines may be implemented according to the same design principles discussed above with respect to FIG. 2 and the single path 209 observed therein. Additional considerations may have to be made, however, for the additional stubs and branches to ensure small propagation delay to all pipelines within the processor. An example includes a driver at the input or and/or drivers to each core. FIG. 4b shows multiple processors of the type observed in FIG. 4a being powered by the same power supply unit.

Figure 5:
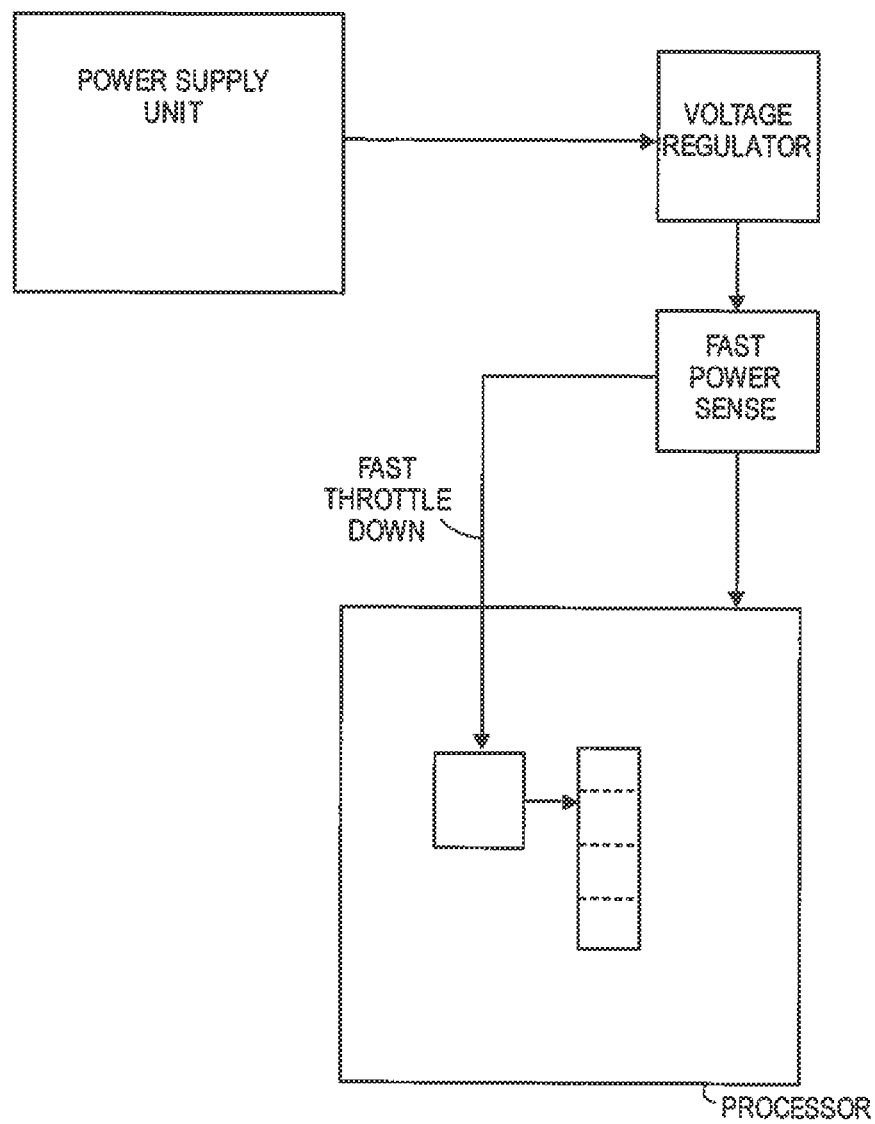
FIG. 5 shows another improved power system design.

FIG. 5 shows that the fast power sense circuit may be inserted between the voltage regulator and the processor. In this case, power sense circuit detects the power draw of the processor directly from the processor rather than through the voltage regulator. System designers may plan for the inefficiency of the voltage regulator to correlate what specific directly monitored draw of the processor corresponds to a threshold level of the power supply unit being crossed where the power supply unit can no longer provide sustained power.

Figure 6:
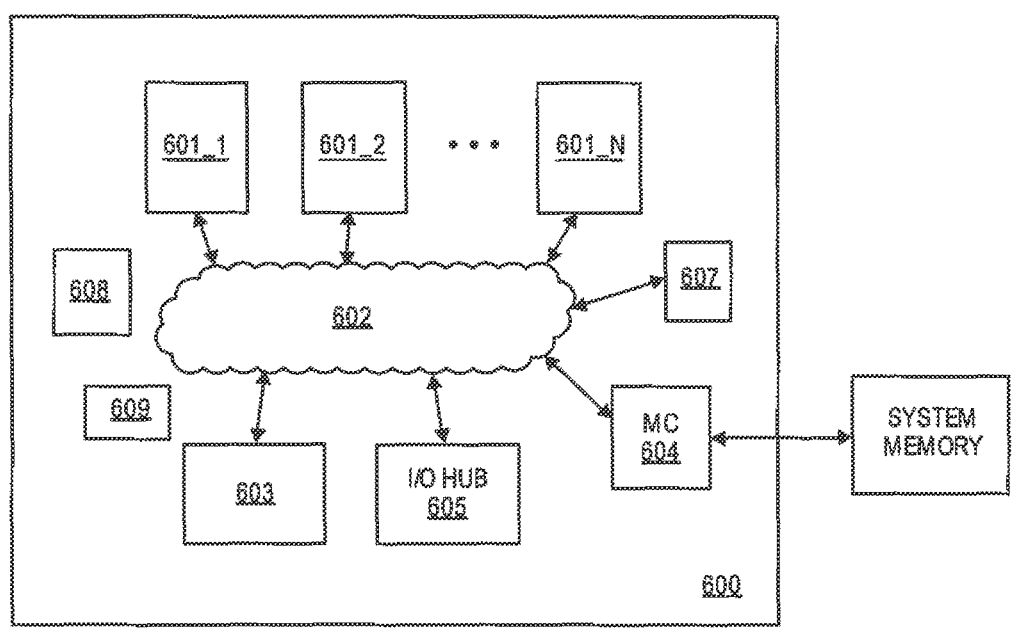
FIG. 6 shows a multi-core processor that can be used to build a multi-processor computer.

FIG. 6 shows the architecture of an exemplary multi-core processor 600. As observed in FIG. 6, the processor includes: 1) multiple processing cores 601_1 to 601_N; 2) an interconnection network 602; 3) a last level caching system 603; 4) a memory controller 604 and an I/O hub 605. Each of the processing cores contain one or more instruction execution pipelines for executing program code instructions. The interconnect network 602 serves to interconnect each of the cores 601_1 to 601_N to each other as well as the other components 603, 604, 605. The last level caching system 603 serves as a last layer of cache in the processor before instructions and/or data are evicted to system memory 606.

The memory controller 604 reads/writes data and instructions from/to system memory 606. The I/O hub 605 manages communication between the processor and "I/O" devices (e.g., non volatile storage devices and/or network interfaces). Port 607 stems from the interconnection network 602 to link multiple processors so that systems having more than N cores can be realized. Graphics processor 608 performs graphics computations. Power management circuitry 609 manages the performance and power states of the processor as a whole ("package level") as well as aspects of the performance and power states of the individual units within the processor such as the individual cores. Other functional blocks of significance (e.g., phase locked loop (PLL) circuitry) are not depicted in FIG. 6 for convenience.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
    a signal path from an input of said processor to logic circuitry within said processor, said input to receive a throttle down signal in response to a power draw of the processor beyond a rated maximum power of a power supply unit of the processor, said logic circuitry to throttle down a rate at which said processor issues instructions for execution in response to said throttle down signal to reduce the power draw of the processor below the rated maximum power within a predetermined time window that the power supply unit supplies power beyond the rated maximum power.

2. The processor of claim 1 wherein said signal path includes a controlled impedance transmission line.

3. The processor of claim 1 wherein said signal path does not include logic circuitry that performs logical processing on said throttle down signal.

4. The processor of claim 1 further comprising a register to hold a value that dictates a rate at which instructions are to be executed in response to said throttle down signal.

5. The processor of claim 1 wherein said processor includes logic circuitry to notify software that said throttle down signal has been received.

6. The processor of claim 1 wherein said processor includes a register to specify how long said processor is to issue instructions at a throttled down rate.

7. The processor of claim 1 wherein said processor includes a register to specify a performance state said processor is to transition into after said processor is no longer restricted to issuing instructions at a throttled down rate.

8. A computing system comprising:
    a power supply unit;
    a processor having a signal path from an input of said processor to logic circuitry within said processor, said input to receive a throttle down signal in response to a power draw of the processor beyond a rated maximum power of the power supply unit, said logic circuitry to throttle down a rate at which said processor issues instructions for execution in response to said throttle down signal to reduce the power draw of the processor below the rated maximum power within a predetermined time window that the power supply unit supplies power beyond the rated maximum power; and
    sense circuitry having an output coupled to said input, said sense circuitry coupled to a circuit path, said circuit path to supply power to said processor, wherein said sense circuitry is to detect the power draw that exceeds the rated maximum power and generate said throttle down signal in response.

9. The computing system of claim 8 wherein said sense circuitry is coupled between a voltage regulator and said power supply unit along said circuit path, said voltage regulator coupled between said sense circuitry and said processor along said circuit path.

10. The computing system of claim 8 wherein said sense circuitry is coupled between a voltage regulator and said processor along said circuit path, said voltage regulator coupled between said sense circuitry and said power supply unit along said circuit path.

11. The computing system of claim 8 wherein said processor is a multi-core processor.

12. The computing system of claim 8 wherein a power draw drop of said processor, in response to said throttle down of the rate at which said processor issues instructions, is to cause a corresponding power draw drop from said power supply unit to at least a level that said power supply unit is to sustain after said throttle down.

13. The computing system of claim 8 further comprising a non-transitory machine readable medium containing program code that when processed by said computing system causes a method to performed, comprising:
 performing any of the following:
  programming a value into said processor that specifies said rate when said processor's instruction issuance is throttled down;
  programming a value into said processor that specifies how long said processor is to issue instructions at a throttled down rate; and
  programming a value into said processor that specifies a performance state of said processor that said processor is to enter after said processor is no longer restricted to issuing instructions at a throttled down rate.

14. The processor of claim 1 wherein a throttled down rate is zero instructions per unit time.

15. A method comprising:
 in response to a power draw of a power supply unit exceeding a rated maximum power of the power supply unit, asserting a signal, said power draw caused by a processor; and
 in response to said asserting of said signal, throttling down an instruction issue rate of said processor to reduce the power draw of the processor below the rated maximum power within a predetermined time window that the power supply unit supplies power beyond the rated maximum power.

16. The method of claim 15 wherein said asserting is performed between a voltage regulator and the power supply unit.

17. The method of claim 15 wherein said asserting is performed between a voltage regulator and said processor.

18. The method of claim 15 further comprising placing said processor in a pre-determined performance state after said throttled down instruction issue rate restriction has been lifted, said pre-determined performance state being lower than a highest performance state.

19. The method of claim 15 further comprising passing said signal through said processor over a controlled impedance transmission line.

20. The method of claim 19 further comprising passing said signal through said processor to avoid logic processing of said signal within said processor.

21. The processor of claim 1, wherein the predetermined time window is less than about 100 microseconds.

22. The computing system of claim 8, wherein the predetermined time window is less than about 100 microseconds.

23. The method of claim 15, wherein the predetermined time window is less than about 100 microseconds.

* * * * *